US011736518B2

(12) United States Patent
Compton

(10) Patent No.: US 11,736,518 B2
(45) Date of Patent: *Aug. 22, 2023

(54) REDUCING THE IMPACT OF BORDER GATEWAY PROTOCOL (BGP) HIJACKS

(71) Applicant: Charter Communications Operating, LLC, St. Louis, MO (US)

(72) Inventor: Richard Compton, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/235,998

(22) Filed: Apr. 21, 2021

(65) Prior Publication Data

US 2021/0258343 A1  Aug. 19, 2021

Related U.S. Application Data

(63) Continuation of application No. 15/973,778, filed on May 8, 2018, now Pat. No. 11,012,470.

(51) Int. Cl.
*H04L 9/40* (2022.01)
*H04L 45/74* (2022.01)
*H04L 12/66* (2006.01)

(52) U.S. Cl.
CPC .......... *H04L 63/1466* (2013.01); *H04L 45/74* (2013.01); *H04L 63/1416* (2013.01); *H04L 12/66* (2013.01)

(58) Field of Classification Search
CPC . H04L 63/1466; H04L 63/1416; H04L 45/74; H04L 12/66
See application file for complete search history.

(56) References Cited

U.S. PATENT DOCUMENTS

| 7,823,202 B1 | 10/2010 | Nucci et al. |
| 10,015,081 B1 * | 7/2018 | Heitz ............... H04L 45/748 |
| 2010/0132037 A1 * | 5/2010 | Ji ..................... H04L 63/1416 726/22 |
| 2011/0093612 A1 * | 4/2011 | Murakami ........... H04L 63/20 709/238 |

(Continued)

FOREIGN PATENT DOCUMENTS

| FR | 3044195 A1 | 5/2017 |
| JP | 2011-87302 A | 4/2011 |

(Continued)

OTHER PUBLICATIONS

Chaviaras, et al., "ARTEMIS: Real-Time Detection and Automatic Mitigation for BGP Prefix Hijacking", Proceedings of the 2016 ACM SIGCOMM Conference, pp. 625-626, (Aug. 2016).

(Continued)

*Primary Examiner* — Hee K Song
(74) *Attorney, Agent, or Firm* — The Marbury Law Group, PLLC

(57) ABSTRACT

Systems, methods, and devices of the various embodiments may enable the reduction of the impact of Border Gateway Protocol (BGP) hijacks by automatically announcing more-specific route prefixes when a netblock is hijacked. In various embodiments, the more-specific route prefixes may be automatically withdrawn when the netblock hijacking stops.

24 Claims, 7 Drawing Sheets

(56) References Cited

U.S. PATENT DOCUMENTS

| | | | |
|---|---|---|---|
| 2011/0138466 A1* | 6/2011 | Ji | .......... H04L 63/1466 726/23 |
| 2011/0153801 A1* | 6/2011 | Ji | .......... H04L 41/12 709/224 |
| 2017/0180418 A1* | 6/2017 | Shen | .......... H04L 63/1466 |

FOREIGN PATENT DOCUMENTS

| | | | | |
|---|---|---|---|---|
| JP | 2016-111597 A | 6/2016 | | |
| WO | 2017147166 A1 | 8/2017 | | |
| WO | WO-2017147166 A1 * | 8/2017 | ......... | H04L 45/04 |

OTHER PUBLICATIONS

Sempezis, et al., "Monitor, Detect, Mitigate: Combating BGP Prefix Hijacking in Real-Time with ARTEMIS", In Proceedings of the ACM SIGCOMM 2016 Conference (SIGCOMM'16), 625-626, pp. 1-7, (Sep. 2016).

* cited by examiner

REDUCING THE IMPACT OF BORDER GATEWAY PROTOCOL (BGP) HIJACKS

RELATED APPLICATIONS

This application is a continuation of, and claims priority to, pending U.S. patent application Ser. No. 15/973,778 filed May 8, 2018 entitled "Reducing The Impact Of Border Gateway Protocol (BGP) Hijacks", the entire contents of which are hereby incorporated by reference for all purposes.

BACKGROUND

Internet Service Providers (ISPs) continually face the threat of Border Gateway Protocol (BGP) hijacks. In a BGP hijack, a malicious attacker causes Internet traffic to be misrouted by manipulating BGP routing data. The misrouting of Internet traffic due to BGP hijacks represents a significant security threat to ISPs and Internet users as traffic is forwarded through malicious computing devices and is often not forwarded to its intended destination at all.

SUMMARY

The systems, methods, and devices of the various embodiments disclosed herein may enable the reduction of the impact of Border Gateway Protocol (BGP) hijacks by automatically announcing more-specific route prefixes when a netblock is hijacked. In various embodiments, the more-specific route prefixes may be automatically withdrawn when the netblock hijacking stops. Various embodiments may provide a method of mitigating a BGP hijack that may be performed by a processor of a computing device. The method may include determining an attribute of a hijacked netblock in response to receiving a BGP netblock hijack indication, determining whether more-specific routing prefixes are available for the hijacked netblock based at least in part on the determined attribute of the hijacked netblock, generating more-specific replacement routing prefixes for the hijacked netblock in response to determining that more-specific routing prefixes are available for the hijacked netblock, and sending a BGP update including the more-specific replacement routing prefixes for the hijacked netblock to a router. In various embodiments, the more-specific replacement routing prefixes for the hijacked netblock may have a prefix length of 24 bits, 48 bits, etc. In various embodiments, the more-specific replacement routing prefixes for the hijacked netblock may have a prefix length of 24 bits, such as for Internet Protocol version 4 (IPv4) addresses, or 48 bits, such as for Internet Protocol version 6 (IPv6) addresses. Various embodiments may include receiving the BGP netblock hijack indication. Various embodiments may include generating a less-specific routing prefix for the hijacked netblock in response to determining the BGP hijack is complete, and sending a BGP update including the less-specific routing prefix for the hijacked netblock to the router. Various embodiments may include sending a BGP withdraw removing the more-specific replacement routing prefixes in response to determining the BGP hijack is complete. In some embodiments, determining the BGP hijack is complete may be based at least in part on a BGP netblock reclamation time period expiring or receiving a BGP netblock hijack all clear indication. In various embodiments, the BGP netblock reclamation time period may be any period of time, such as one week, etc. Various embodiments may include sending a BGP withdraw removing the more-specific replacement routing prefixes for the hijacked netblock to the router in response to determining the BGP hijack is complete. In some embodiments, the more-specific replacement routing prefixes for the hijacked netblock may have a prefix length of 24 bits and the less-specific routing prefix for the hijacked netblock may have a prefix length of 23 bits or lower. In some embodiments, the more-specific replacement routing prefixes for the hijacked netblock may have a prefix length of 48 bits and the less-specific routing prefix for the hijacked netblock may have a prefix length of 47 bits or lower.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
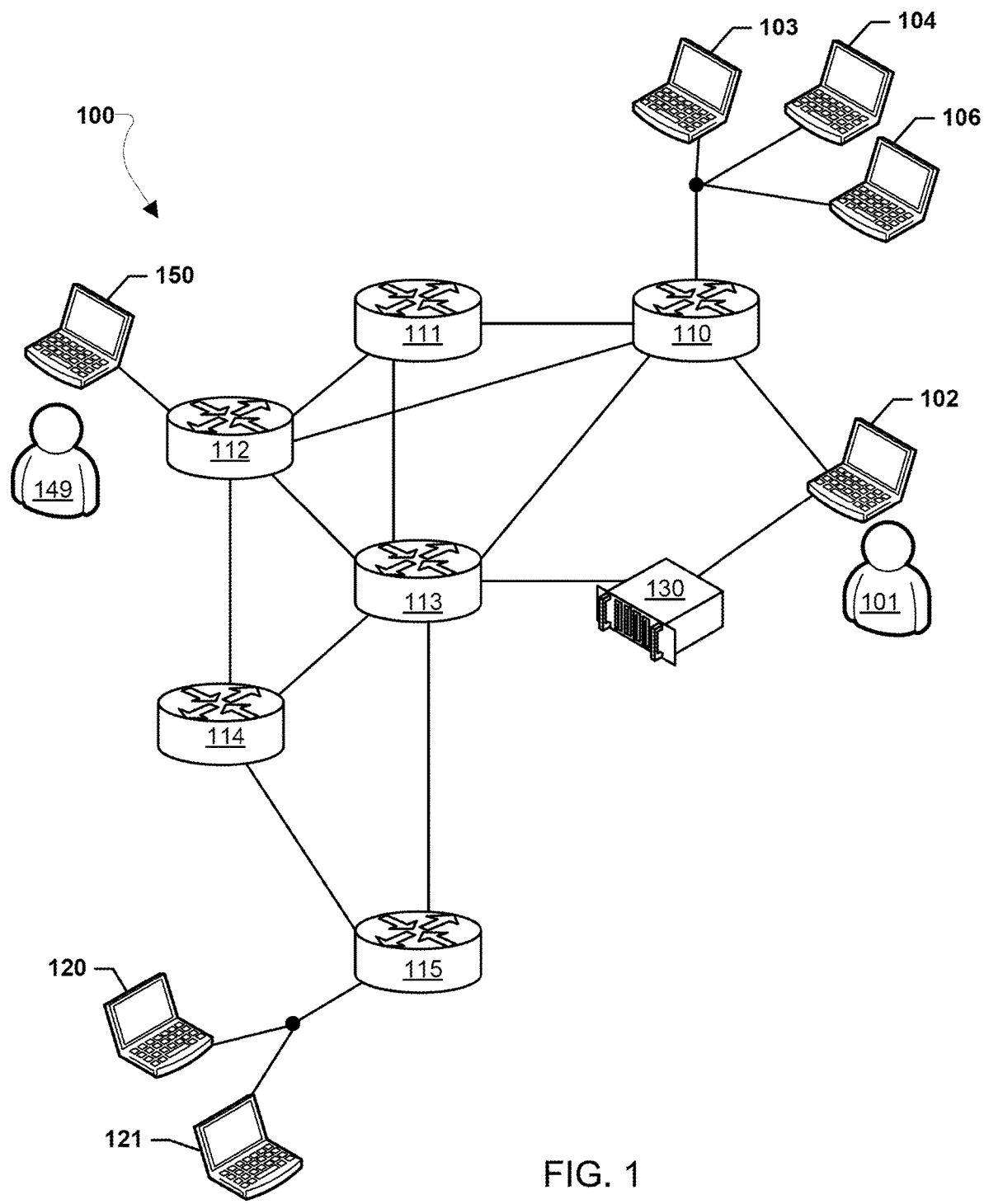
FIG. 1 is a communication system block diagram of an IP network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "computing device" is used interchangeably herein to refer to any one or all of satellite or cable set top boxes, laptop computers, rack mounted computers, routers, cable modem termination systems (CMTSs), cellular telephones, smart phones, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

According to the Border Gateway Protocol (BGP), an entity (also referred to as an Autonomous Systems (AS) in BGP), such as an Internet Service Provider (ISP), that is assigned a range of Internet Protocol (IP) addresses, i.e., a netblock, may advertise or announce that the netblock is reachable by announcing a route to the entity with a route prefix for the netblock in a BGP update. A route prefix may indicate a netblock's IP address prefix and a length of the IP address prefix as a number of bits. For example, an entity assigned the netblock "24.158.32.0/22" may cause traffic to be routed to it by sending a BGP update from its routers (e.g., peer routers, edge routers, etc.) announcing a route with the route prefix "24.158.32.0/22". The route prefix "24.158.32.0/22" indicates the IP address prefix of the netblock of the entity "24.158.32.0/22" and that the entity's IP address prefixes are 22 bits long. The length of a route prefix governs whether the route prefix is considered more-specific or less-specific; with longer lengths (i.e., a larger number of bits) indicating a route prefix is more-specific. As such, a route prefix of "24.158.32.0/22" is considered more-specific in BGP than a route prefix of "24.158.32.0/21" because the length "22" is a larger number of bits (i.e., 22 bits) than the length "21" (i.e., 21 bits). The maximum length of a route prefix may be governed by the IP version used for the IP address. For example, in IP version 4 (IPv4) a route prefix may have a maximum length of 32 bits. As another example, in IP version 6 (IPv6) a route prefix may have a maximum length of 128 bits. The length of a less-specific route prefix also governs how many more-specific route prefixes make up that less-specific route prefix. For example, the less-specific router prefix of "24.158.32.0/22" is made up of four more-specific /24 route prefixes "24.158.32.0/24", "24.158.33.0/24", "24.158.34.0/24" and 24.158.35.0/24" Similarly, the less-specific router prefix of "24.158.32.0/23" is made up of two more-specific /24 route prefixes "24.158.32.0/24" and "24.158.33.0/24."

In BGP, more-specific routes are generally favored over less-specific routes. Thus, in BGP when a router identifies two or more routes to the same netblock in its routing tables, the route with the more-specific route prefix is selected for routing traffic. As an example, a first route with the route prefix "24.0.0.0/9" and a second route with the route prefix "24.0.0.0/8" may be present in the routing table of a router. According to BGP, the router may select the first route with the route prefix "24.0.0.0/9" to use to route traffic for the netblock with the IP address prefix "24.158.32.0/24" because the route prefix with the length of 9 (i.e., route prefix "24.0.0.0/9" is more-specific than the route prefix with the length of 8 (i.e., route prefix "24.0.0.0/8"). In this manner, all traffic for the netblock "24.158.32.0/24" passing through the router will be routed along the first route with the more-specific route prefix (i.e., route prefix "24.0.0.0/9").

In a BGP netblock hijack, a malicious attacker may cause Internet traffic to be misrouted by announcing a malicious route with a more-specific prefix of a netblock the malicious attacker is not actually assigned. For example, the entity assigned the netblock "24.158.32.0/22" may normally announce its routes with a routing prefix of "24.158.32.0/22". To hijack Internet traffic intended for the netblock "24.158.32.0/23", a malicious attacker may announce a malicious route with the routing prefix "24.158.32.0/23" that is more-specific that the entity's normal routing prefix of "24.158.32.0/22". The announcement of the malicious route may be propagated from router to router according to BGP and the malicious route with the more-specific routing prefix (i.e., routing prefix "24.158.32.0/23") may be used to route Internet traffic by all impacted routers. In this manner, the malicious attacker may hijack the traffic for "24.158.32.0/23" out of the netblock "24.158.32.0/22" because the malicious route will be used for routing Internet traffic, rather than the intended route by the entity actually assigned the netblock "24.158.32.0/22".

One way for an entity to reduce the impact of such BGP netblock hijacks is for an entity to announce its own routes with more-specific route prefixes than those used by the malicious attacker. Continuing with the example above, the entity may send a BGP update for its route to netblocks "24.158.32.0/24" and "24.158.33.0/24" which are more-specific (i.e., has a longer length of 24 bits) than the routing prefix used by the malicious attacker of "24.158.32.0/23". The propagation of the more-specific routing prefixes (e.g., "24.158.32.0/24" and "24.158.33.0/24") for the hijacked route may undue the hijacking as the more-specific routing prefixes will be used by routers.

The systems, methods, and devices of the various embodiments disclosed herein may enable the reduction of the impact of BGP hijacks by automatically announcing more-specific route prefixes when a netblock is hijacked. Various embodiments may provide methods for mitigating BGP hijacks.

In various embodiments, BGP messages sent and received between different ASs, such as BGP messages reflecting BGP updates, BGP withdraws, etc., may be monitored by a monitoring device. The monitoring device may be a computing device of an ISP running a virtual machine or other container performing operations to monitor BGP messages or may be a third party computing device performing operations to monitor BGP messages. The monitoring device may analyze the BGP messages to determine whether or not a BGP hijack, such as a BGP netblock hijack, is occurring. For example, when the monitoring device observes that a BGP log message indicates a BGP message (e.g., a BGP update, etc.) changed a routing prefix for an entity (e.g., updated the routing prefix to be more-specific) but the BGP message did not originate from an entity with an Autonomous System Number (ASN) associated with the netblock, the monitoring device may determine a BGP hijack is occurring. In response to determining a BGP hijack is occurring, the monitoring device may send a BGP netblock hijack indication to a computing device of the entity, such as an ISP, actually assigned the netblock. The BGP netblock hijack indication may be generated and sent by the monitoring device within a matter of seconds of determining a BGP hijack is occurring. In various embodiments, the BGP netblock hijack indication may include indications of attributes of any hijacked netblocks identified by the monitoring device and hijacked routes associated with hijacked netblocks. The attributes of the hijacked netblocks and hijacked routes may include the routing prefix, the prefix length, the destination ASN, the originating ASN, or any other attribute available in BGP data.

In various embodiments, a computing device of an entity, such as an ISP, may receive a BGP netblock hijack indication. When a third party monitoring device generates BGP netblock hijack indications, the BGP netblock hijack indication may be received over a connection between the monitoring device and the computing device of the entity. When the monitoring device is a computing device of the entity itself, such as a virtual machine, the BGP netblock hijack indication may be received via internal notifications on the computing device of the entity, such as via an application programming interface (API) call between a virtual machine performing monitoring functions and a virtual machine operating to mitigate BGP hijacking impacts. The BGP netblock hijack indication may include indications of attributes of hijacked netblocks and hijacked routes associated with hijacked netblocks. The attributes of the hijacked netblocks and hijacked routes may include the routing prefix, the prefix length, the destination ASN, the originating ASN, or any other attribute available in BGP data. As a specific example, the BGP netblock hijack indication may indicate the IP address prefix and length of the prefix used in the BGP netblock hijack.

In various embodiments, the computing device of an entity, such as an ISP, may determine an attribute of a hijacked netblock in response to receiving a BGP netblock hijack indication. In various embodiments, determining an attribute of the hijacked netblock may include parsing the BGP netblock hijack indication to identify attributes of the hijacked netblocks. For example, the computing device may parse the BGP netblock hijack indication to determine the IP address prefix and length of the prefix used in the BGP netblock hijack. In various embodiments, the computing device may compare the determined attributes, such as the IP address prefix, to data stored in a memory available to the computing device to determine additional attributes of the hijacked netblock. Additional attributes of the hijacked netblock may include the original, current, and/or default settings for the netblock as intended by the entity. For example, the additional attributes may indicate peer routers of the entity associated with the netblock, the original, current, and/or default prefix length used for the netblock, maximum prefix lengths, a routing prefix setting at the time the BGP netblock hijack occurred, etc.

In various embodiments, the computing device of the entity, such as the ISP, may determine whether more-specific routing prefixes are available for the hijacked netblock based at least in part on the determined one or more attributes of the hijacked netblock. For example, the computing device may compare the prefix length for the hijacked netblock indicated in the received BGP netblock hijack indication to the maximum prefix length for the netblock. In response to the prefix length for the hijacked netblock indicated in the received BGP netblock hijack indication being less than the maximum prefix length for the netblock, the computing device may determine that more-specific routing prefixes are available for the hijacked netblock. Similarly, in response to the prefix length for the hijacked netblock indicated in the received BGP netblock hijack indication being equal to the maximum prefix length for the netblock, the computing device may determine that more-specific routing prefixes are not available for the hijacked netblock.

In various embodiments, the computing device of the entity, such as the ISP, may generate more-specific replacement routing prefixes for the hijacked netblock in response to determining that more-specific routing prefixes are available for the hijacked netblock. Generating more-specific replacement routing prefixes may include generating replacement routing prefixes with a length at least one bit greater than the prefix length of used in the hijacking of the netblock. As one example, generating more-specific replacement routing prefixes may include generating replacement routing prefixes with a length equal to the maximum prefix length for the netblock. Generating maximum length more-specific replacement routing prefixes may reduce the likelihood of follow on BGP hijacking as malicious actors may no longer generate false more-specific routing prefixes than the more-specific replacement routing prefixes. In various embodiments, the maximum length of a routing prefix may be 24 bits and routing prefixes with lengths of 24 may be generated to mitigate BGP hijacks. Such routing prefixes with lengths of 24 may be used for IPv4 or IPv6 addresses. In various embodiments, the maximum length of a routing prefix may be 48 bits and routing prefixes with lengths of 48 may be generated to mitigate BGP hijacks. Such routing prefixes with lengths of 48 may be used for IPv6 addresses.

In various embodiments, the computing device of the entity, such as the ISP, may send a BGP update including the more-specific replacement routing prefixes for the hijacked netblock to a router. For example, the more-specific replacement routing prefixes for the hijacked netblock may be sent to one or more peer router of the entity, an edge router of the entity, etc. The computing device may store the addresses of routers, such as peer routers, edge routers, etc., in a memory associated with various netblocks, and may send BGP updates to those routers associated with the hijacked netblock. In turn, those routers may propagate the more-specific replacement routing prefixes upstream and downstream to other connected routers according to BGP. As such, the change of the routing prefixes for the hijacked netblock to the more-specific replacement routing prefixes may be propagated across the Internet and the BGP hijack may be mitigated because all routers receiving the update should favor the more-specific replacement routing prefixes in BGP. In various embodiments, the sending of a BGP update including the more-specific replacement routing prefixes for the hijacked netblock to a router and the propagation of the more-specific replacement routing prefixes may occur within a period of seconds.

In various embodiments, the more-specific route prefixes may be automatically withdrawn when the netblock hijacking stops. Withdrawing, or otherwise stopping the advertisement of the more-specific routes after the netblock hijacking stops may prevent the advertising of an excessive number of routes which may take up excessive processing, memory, and bandwidth capabilities in a network. In some embodiments, determining the BGP hijack is complete may be based at least in part on a BGP netblock reclamation time period expiring. The BGP netblock reclamation time period may be a time period after which netblock prefixes may be set back to their default prefix length settings or the routing prefix setting at the time the BGP netblock hijack occurred, e.g., less-specific shorter prefix lengths. In various embodiments, the BGP netblock reclamation time period may be any period of time, such as one week. In some embodiments, determining the BGP hijack is complete may be based at least in part on receiving a BGP netblock hijack all clear indication. In some embodiments, BGP netblock hijack all clear indications may be received from monitoring devices. Various embodiments may include sending a BGP withdraw removing the more-specific replacement routing prefix for the hijacked netblock to the router in response to determining the BGP hijack is complete.

Various embodiments may include generating a less-specific routing prefix for the hijacked netblock in response to determining the BGP hijack is complete. For example, rather than a routing prefix with a maximum prefix length, a routing prefix with a less than maximum length prefix may be generated. Various embodiments may include sending a BGP update including the less-specific routing prefix for the hijacked netblock to the router.

Various examples of different protocols are discussed herein, such as BGP, IPv4, and IPv6. The discussions of specific protocols, such as BGP, IPv4, and IPv6, are provided merely as examples to better illustrate the aspects of the various embodiments, and are not intended to limit the various embodiments in any way. Other protocols may be used with the various embodiments, and the other protocols may be substituted in the various examples without departing from the spirit or scope of the invention.

FIG. 1 illustrates an IP network 100 suitable for use with various embodiments. The IP network 100 may include multiple devices, such as routers 110, 111, 112, 113, 114, 115, monitoring devices 130, and computing devices 102, 103, 104, 106, 120, 121, 150. While each router 110, 111, 112, 113, 114, 115 is illustrated in FIG. 1 as a single device, each router 110, 111, 112, 113, 114, 115 may be one or more routers of an entity or AS. The routers 110, 111, 112, 113, 114, 115 and computing devices 102, 103, 104, 106, 120, 121, 150 or the network 100 may exchange data with one another according to IP protocols via their various connections with one another. Collectively, the connections between the routers 110, 111, 112, 113, 114, 115 may represent the Internet and the data routed between the routers 110, 111, 112, 113, 114, 115 may be Internet traffic. The routers 110, 111, 112, 113, 114, 115 may exchange routing information with one another according to BGP. Each router 110, 111, 112, 113, 114, 115 may have its own respective ASN assigned to it to distinguish one router from another router.

A router 110 of an entity, such as an ISP, may be connected to various computing devices receiving service from that entity, such as computing devices 103, 104, 106. A router 115 of a different entity, such as a different ISP, may be connected to various computing devices receiving service from that entity, such as computing devices 120, 121. A range of IP addresses, i.e., a netblock, may be assigned to each different entity (e.g., on a per ASN basis), and the respective computing devices of that entity may be assigned IP addresses within that netblock. Each netblock may have a different IP address prefix. For example, computing devices 103, 104, 106 connected to the router 110 of a first entity may have IP addresses within that first entity's netblock identified by a first IP address prefix and computing devices 120, 121 connected to router 115 of a second entity may have IP addresses with the second entity's netblock identified by a second IP address prefix. As the first IP address prefix of the first netblock may identify that the netblock is associated with the router 110, Internet traffic destined for IP addresses in the first netblock may be routed to router 110 by the other routers 111, 112, 113, 114, 115. Similarly, as the second IP address prefix of the second netblock may identify that the netblock is associated with the router 115, Internet traffic destined for IP addresses in the second netblock may be routed to router 115 by the other routers 110, 111, 112, 113, 114.

The various routers 110, 111, 112, 113, 114, 115 may exchange BGP messages with one another to create, update, and withdraw routing paths among one another in their respective routing tables. As BGP events occur, BGP messages, such as BGP messages reflecting BGP updates, BGP withdraws, etc., may be generated and sent from the routers 110, 111, 112, 113, 114, 115. A monitoring device 130 may be a computing device configured to monitor the BGP messages. The monitoring device 130 may analyze the BGP messages to determine whether or not a BGP hijack, such as a BGP netblock hijack, is occurring. The monitoring device 130 may be connected to a computing device 102 of an entity, such as the ISP, operating router 110 and providing service to computing devices 103, 104, 106. Computing device 102 may be operated by a technician 101 and may output indications of BGP hijacks to the technician 101. Additionally, computing device 102 may control BGP routing information for the entity operating router 110. While illustrated as separate devices 102, 130 in FIG. 1, the monitoring device 130 may alternatively be part of computing device 102, such as a virtual machine running on a processor of computing device 102.

During normal operation, routing of Internet traffic among the routers 110, 111, 112, 113, 114, 115 may occur according to the BGP routing information advertised by the respective entities operating those routers 110, 111, 112, 113, 114, 115. For example, the entity operating router 110 may be assigned the netblock "24.158.32.0/22" and may cause traffic to be routed to router 110 by sending a BGP update announcing a route with the route prefix "24.158.32.0/22". The route prefix "24.158.32.0/22" indicates the IP address prefix of the netblock of the entity "24.158.32.0/22" and that the entity's IP address prefixes are 22 bits long. Routers 111, 112, 113, 114, and 115 may then update their routing tables to route Internet traffic for the netblock "24.158.32.0/22" to router 110 according to the BGP update and Internet traffic destined for computing device 103, 104, 106 with IP addresses in the netblock "24.158.32.0/22" may flow to router 110 for routing to those computing devices.

In a BGP netblock hijack, a malicious attacker 149 may use his or her computing device 150 to corrupt an AS, such as router 112, to hijack netblocks that are not assigned to the malicious attacker 149. The computing device 150 of the malicious attacker 149 may cause Internet traffic to be misrouted by controlling the router 112 to announce a malicious route with a more-specific prefix of a netblock the malicious attacker 149 is not actually assigned. Continuing with the preceding example in which the router 110 may be associated with netblock "24.158.32.0/22", router 110 may normally announce its routes with a routing prefix of "24.158.32.0/22". To hijack Internet traffic intended for the netblock "24.158.32.0/22", the computing device 150 of the malicious attacker 149 may announce a malicious route with the routing prefix "24.158.32.0/23" that is more-specific that the entity's normal routing prefix of "24.158.32.0/22". The announcement of the malicious route may be propagated between routers 111, 112, 113, 114, 115 according to BGP and the malicious route with the more-specific routing prefix (i.e., routing prefix "24.158.32.0/23") may be used to route Internet traffic by all impacted routers 111, 112, 113, 114, and 115. In this manner, the malicious attacker 149 may hijack the netblock "24.158.32.0/23" because the malicious route will be used for routing Internet traffic, rather than the intended route by the entity actually assigned the netblock "24.158.32.0/22". For example, Internet traffic addressed to computing device 103 sent by computing device 120 may be routed from router 115 to router 114 and onto router 112 because the routing prefix "24.158.32.0/23" now associated with router 112 and computing device 150 is more-specific than the entity's normal routing prefix of "24.158.32.0/22".

In various embodiments, the update of the routing prefix by the computing device 150 of the malicious attacker 149 may generate BGP messages that the monitoring device 130 may observe and use to determine that a BGP hijack, such as a BGP netblock hijack, is occurring. For example, the monitoring device 130 may detect that routing prefix change did not originate at the router 110 assigned the netblock "24.158.32.0/22". The determination that a BGP hijack is occurring may cause the monitoring device 130 to send a BGP netblock hijack indication to the computing device 102. In various embodiments, in response to receiving the BGP netblock hijack indication, the computing device 102 may perform operations to mitigate the BGP hijack.

Figure 2:
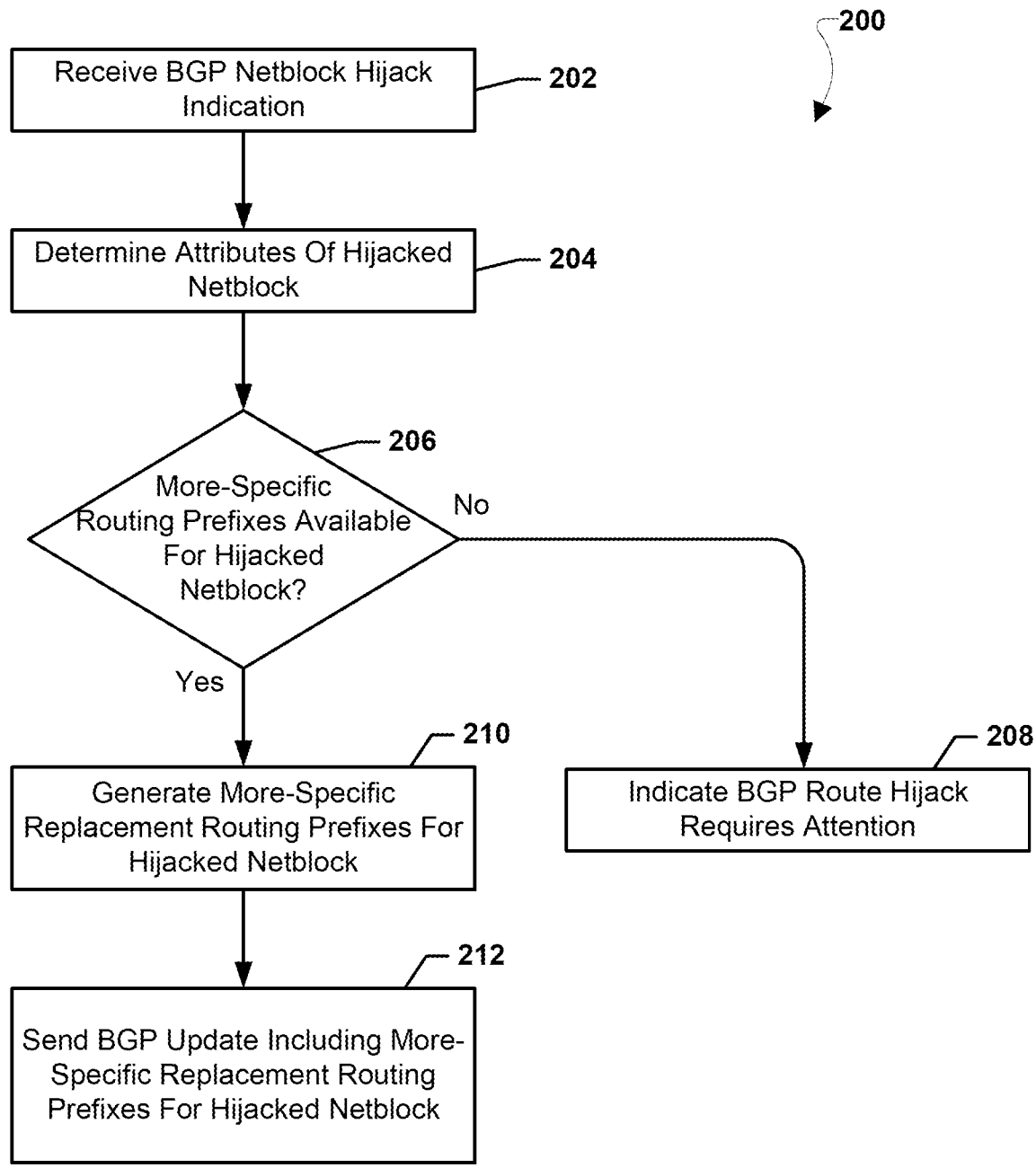
FIG. 2 is a process flow diagram illustrating an embodiment method for mitigating a Border Gateway Protocol (BGP) hijack.

FIG. 2 is a process flow diagram illustrating an embodiment method 200 for mitigating a Border Gateway Protocol (BGP) hijack. In various embodiments, the operations of method 200 may be performed by a computing device, such as computing device 102, of an entity, such as an ISP.

With reference to FIGS. 1 and 2, in block 202, the processor of the computing device may receive a BGP netblock hijack indication. In embodiments in which a third party monitoring device generates BGP netblock hijack indications, the BGP netblock hijack indication may be received over a connection between the monitoring device and the computing device. In embodiments, in which the monitoring device is a computing device of the entity itself, such as a virtual machine, the BGP netblock hijack indication may be received via internal notifications on the computing device of the entity, such as via an API call between a virtual machine performing monitoring functions and a virtual machine operating to mitigate BGP hijacking impacts. The BGP netblock hijack indication may include indications of attributes of hijacked netblocks and hijacked routes associated with hijacked netblocks. The attributes of the hijacked netblocks and hijacked routes may include the routing prefix, the prefix length, the destination ASN, the originating ASN, or any other attribute available in BGP data. As a specific example, the BGP netblock hijack indication may indicate the IP address prefix and length of the prefix used in the BGP netblock hijack.

In block 204, the processor of the computing device may determine one or more attributes of the hijacked netblock. In various embodiments, determining an attribute of the hijacked netblock may include parsing the BGP netblock hijack indication to identify attributes of the hijacked netblocks. For example, the computing device may parse the BGP netblock hijack indication to determine the IP address prefix and length of the prefix used in the BGP netblock hijack. In various embodiments, the computing device may compare the determined attributes, such as the IP address prefix, to data stored in a memory available to the computing device to determine additional attributes of the hijacked netblock. Additional attributes of the hijacked netblock may include the original, current, and/or default settings for the netblock as intended by the entity. For example, the additional attributes may indicate peer routers of the entity associated with the netblock, the original, current, and/or default prefix length used for the netblock, maximum prefix lengths, a routing prefix setting at the time the BGP netblock hijack occurred, etc.

In determination block 206, the processor of the computing device may determine whether more-specific routing prefixes are available for the hijacked netblock. In various embodiments, the computing device may determine whether more-specific routing prefixes are available for the hijacked netblock based at least in part on the determined one or more attributes of the hijacked netblock. For example, the computing device may compare the prefix length for the hijacked netblock indicated in the received BGP netblock hijack indication to the maximum prefix length for the netblock. In response to the prefix length for the hijacked netblock indicated in the received BGP netblock hijack indication being less than the maximum prefix length for the netblock, the computing device may determine that more-specific routing prefixes are available for the hijacked netblock. Similarly, in response to the prefix length for the hijacked netblock indicated in the received BGP netblock hijack indication being equal to the maximum prefix length for the netblock, the computing device may determine that more-specific routing prefixes are not available for the hijacked netblock.

In response to determining that more-specific routing prefixes are not available (i.e., determination block 206="No"), the processor of the computing device may indicate a BGP route hijack requires attention in block 208. For example, the computing device may output an audible and/or visual warning to a technician or other user that increasing the specificity of the routing prefix may not remedy the BGP hijack.

In response to determining that more-specific routing prefixes are available for the hijacked netblock (i.e., determination block 206="Yes"), the processor of the computing device may generate more-specific replacement routing prefixes for the hijacked netblock in block 210. Generating more-specific replacement routing prefixes may include generating replacement routing prefixes with a length at least one bit greater than the prefix length of used in the hijacking of the netblock. As one example, generating more-specific replacement routing prefixes may include generating replacement routing prefixes with a length equal to the maximum prefix length for the netblock. Generating maximum length more-specific replacement routing prefixes may reduce the likelihood of follow on BGP hijacking as malicious actors may no longer generate false more-specific routing prefixes than the more-specific replacement routing prefixes. In various embodiments, the maximum length of a routing prefix may be 24 bits and routing prefixes with lengths of 24 may be generated to mitigate BGP hijacks. Such routing prefixes with lengths of 24 may be used for IPv4 addresses. In various embodiments, the maximum length of a routing prefix may be 48 bits and routing prefixes with lengths of 48 may be generated to mitigate BGP hijacks. Such routing prefixes with lengths of 48 may be used for IPv6 addresses.

In block 212, the processor of the computing device may send a BGP update including the more-specific replacement routing prefixes for the hijacked netblock. For example, the more-specific replacement routing prefixes for the hijacked netblock may be sent to one or more peer router of the entity, an edge router of the entity, etc. The computing device may store the addresses of routers, such as peer routers, edge routers, etc., in a memory associated with various netblocks, and may send BGP updates to those routers associated with the hijacked netblock. In turn, those routers may propagate the more-specific replacement routing prefixes upstream and downstream to other connected routers according to BGP. As such, the change of the routing prefixes for the hijacked netblock to the more-specific replacement routing prefixes may be propagated across the Internet and the BGP hijack may be mitigated because all routers receiving the update should favor the more-specific replacement routing prefixes in BGP. In various embodiments, the sending of a BGP update including the more-specific replacement routing prefixes for the hijacked netblock to a router and the propagation of the more-specific replacement routing prefixes may occur within a period of seconds.

Figure 3A:
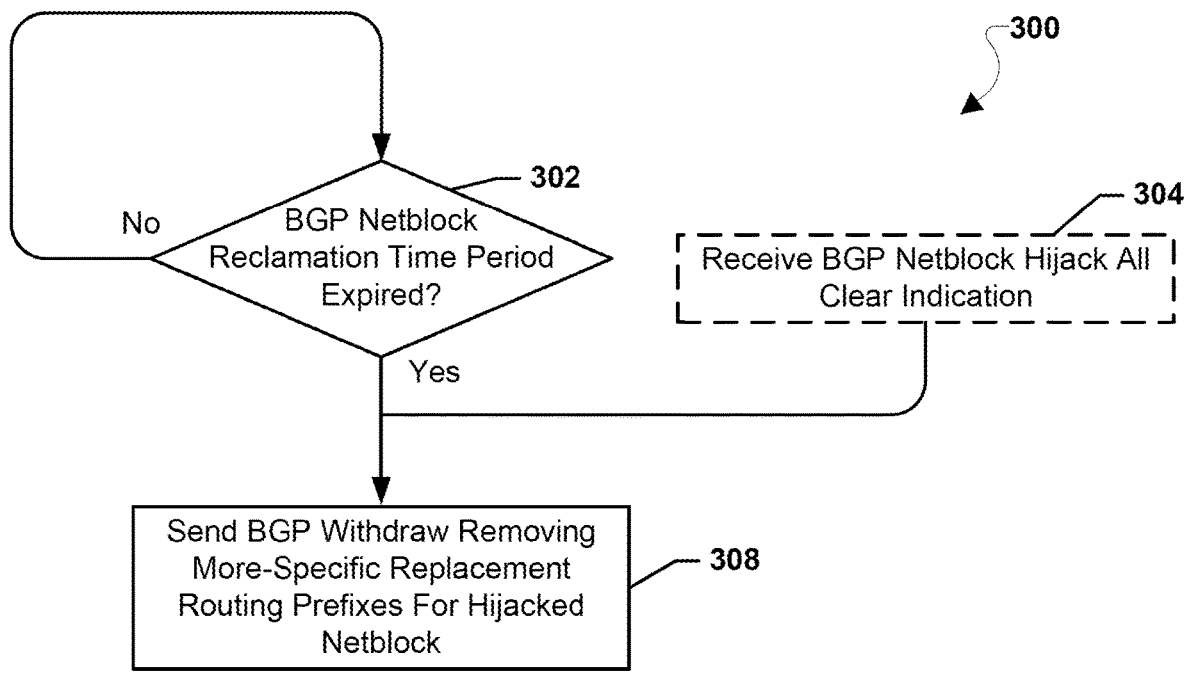
FIG. 3A is a process flow diagram illustrating an embodiment method for withdrawing more-specific replacement routing prefixes when a BGP hijack is complete.

FIG. 3A is a process flow diagram illustrating an embodiment method 300 for withdrawing a more-specific replacement routing prefixes when a BGP hijack is complete. In various embodiments, the operations of method 300 may be performed by a computing device, such as computing device 102, of an entity, such as an ISP. In various embodiments, the operations of method 300 may be performed in conjunction with the operations of method 200 (FIG. 2).

With reference to FIGS. 1-3A, in determination block 302, the processor of the computing device may determine whether the BGP netblock reclamation time period has expired. The BGP netblock reclamation time period may be a time period after which netblock prefixes may be set back to their default prefix length settings or the routing prefix setting at the time the BGP netblock hijack occurred, e.g., less-specific shorter prefix lengths. In various embodiments, the BGP netblock reclamation time period may be any period of time, such as one week. In various embodiments, a count-up timer may be started when a BGP update is sent to mitigate a BGP hijack, and that timer may be compared to the BGP netblock reclamation time period to whether the BGP netblock reclamation time period has expired. Alternatively, the timer may be a countdown timer equal to the length of the BGP netblock reclamation time period and the timer expiring may indicate that the BGP netblock reclamation time period has expired.

In response to determining that the BGP netblock reclamation time period has not expired (i.e., determination block 302="No"), the processor of the computing device may continue to determine whether the BGP netblock reclamation time period has expired in determination block 302.

In an optional embodiment, without regard to the BGP netblock reclamation time period, the processor of the computing device may receive a BGP netblock hijack clear indication in block 304. In some embodiments, BGP netblock hijack all clear indications may be received from monitoring devices. A BGP netblock hijack all clear indication may be an indication that the netblock hijacking has stopped.

In response to receiving a BGP netblock hijack clear indication (i.e., optional block 304) or in response to determining that the BGP netblock reclamation time period has expired (i.e., determination block 302="Yes"), the processor of the computing device may send a BGP withdraw removing the more-specific replacement routing prefixes for the hijacked netblock in block 308. As the BGP netblock hijack may already have stopped, the more-specific replacement routing prefixes may be removed, reverting the routing tables of impacted routers to the original routing prefix used by the entity (e.g., the routing prefix setting at the time the BGP netblock hijack occurred having a less-specific shorter prefix length than the more-specific replacement routing prefixes being removed).

Figure 3B:
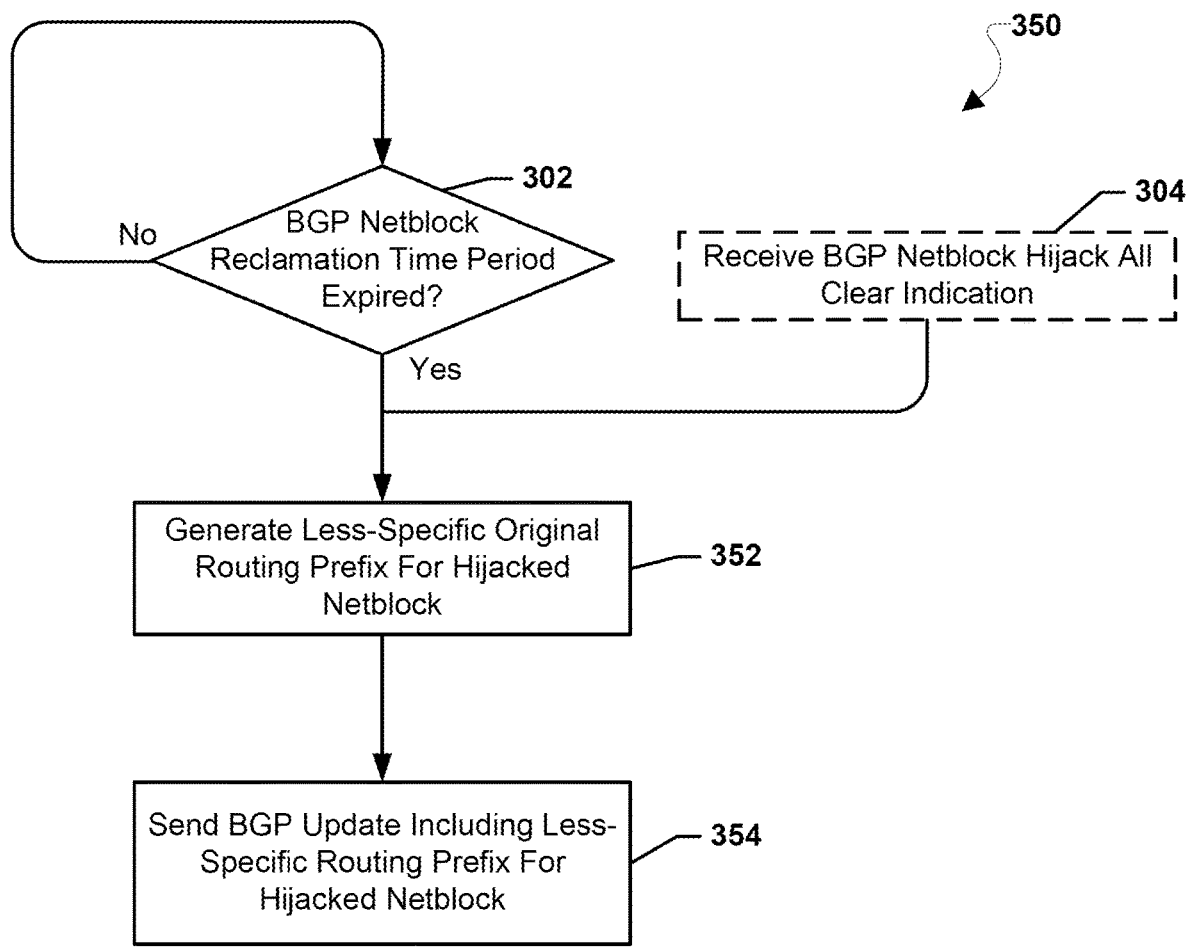
FIG. 3B is a process flow diagram illustrating an embodiment method for replacing more-specific replacement routing prefixes with a less-specific routing prefix when a BGP hijack is complete.

FIG. 3B is a process flow diagram illustrating an embodiment method 350 for replacing the more-specific replacement routing prefixes with a less-specific routing prefix when a BGP hijack is complete. In various embodiments, the operations of method 350 may be performed by a computing device, such as computing device 102, of an entity, such as an ISP. In various embodiments, the operations of method 350 may be performed in conjunction with the operations of method 200 (FIG. 2).

With reference to FIGS. 1-3B, in blocks 302 and 304, the processor of the computing device may perform like numbered operations of like numbered blocks of method 300 described above with reference to FIG. 3A.

In response to receiving a BGP netblock hijack clear indication (i.e., optional block 304) or in response to determining that the BGP netblock reclamation time period has expired (i.e., determination block 302="Yes"), the processor of the computing device may generate a less-specific routing prefix for the hijacked netblock in block 352. For example, rather than a routing prefix with a maximum prefix length, a routing prefix with a less than maximum length prefix may be generated. As a specific example, the maximum length may be 24 bits and the less-specific routing prefix may have a length of 22 bits. As another example for IPv6, the maximum length may be 48 bits and the less-specific routing prefix may have a length of 46 bits. The length of the less-specific routing prefix may be different than the length of the routing prefix before the malicious BGP hijack occurred.

In block 354, the processor of the computing device may send a BGP update including the less-specific routing prefix for the hijacked netblock to the router. As the BGP netblock hijack may already have stopped, the less-specific replacement routing prefix may be used.

Figure 4:
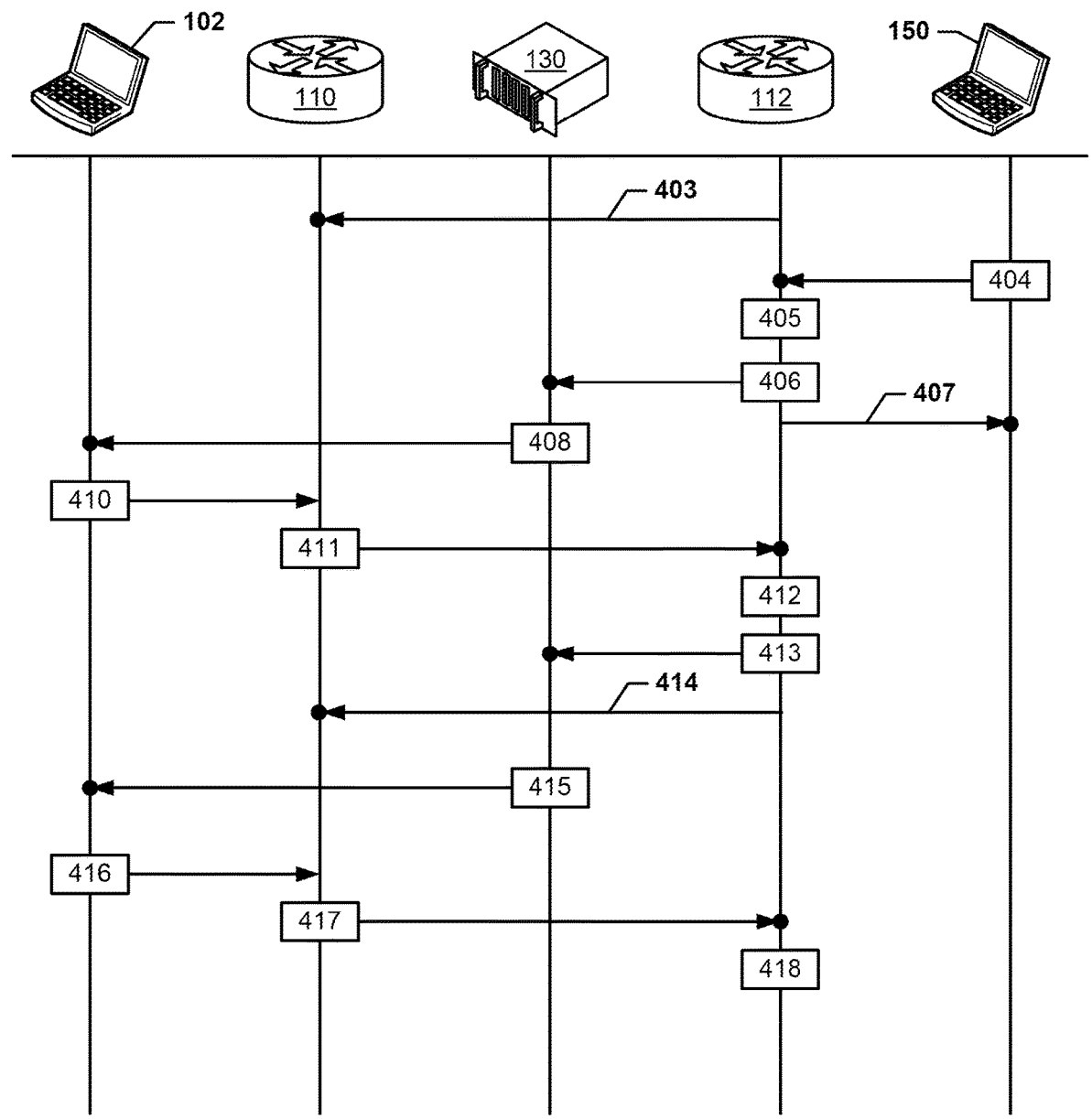
FIG. 4 is a call flow diagram illustrating interactions between various devices to mitigate a BGP hijack according to various embodiments.

FIG. 4 is a call flow diagram illustrating interactions between various devices to mitigate a BGP hijack according to various embodiments. The various interactions illustrated in FIG. 4 may be performed by various devices, such as those discussed above in IP network 100. In various embodiments, the interactions illustrated in FIG. 4 may be one or more operations of methods 200, 300, and/or 350 as described with reference to FIGS. 2-3B.

With reference to FIGS. 1-4, at an initial time router 112's routing table may associate router 110 with the netblock "24.158.32.0/22" according to the routing prefix "24.158.32.0/22". Accordingly, in operation 403, router 112 may route Internet traffic for a netblock "24.158.32.0/22" assigned to router 110 to router 110.

In operation 404, a malicious computing device 150 may send a BGP update to the router 112 with a malicious route with the routing prefix "24.158.32.0/23" that is more-specific than the previous routing prefix of "24.158.32.0/22". In operation 405, the router 112 may update its routing table to reflect the routing prefix "24.158.32.0/23" that is more-specific and associate that with routing the netblock "24.158.32.0" toward malicious computing device 150. In operation 406, the BGP update may be logged and observed by monitoring device 130. In operation 407, Internet traffic that was supposed to go to router 110 for netblock "24.158.32.0" may be routed to malicious computing device 150 resulting in a BGP hijack.

In operation 408, the monitoring device 130 may generate and send a BGP netblock hijack indication to the computing device 102. In operation 410, the computing device 102 may perform operations to mitigate the BGP hijack. For example, the computing device 102 may perform operations of method 200 described above with reference to FIG. 2. The computing device may send a BGP update for its route to netblock "24.158.32.0/22" with the routing prefixes "24.158.32.0/24" and "24.158.33.0/24" that are more-specific (i.e., has a longer length of 24 bits) than the routing prefix used by the malicious attacker of "24.158.32.0/23".

The router 110 may update its routing table in operation 411 and update its neighbor router 112 as well.

In operation 412, the router 112 may update its routing table to reflect the routing prefixes "24.158.32.0/24" and "24.158.33.0/24" that are more-specific and associate that with routing the netblock "24.158.32.0/22" back toward router 110. In operation 413, the BGP update may be logged and observed by monitoring device 130. In operation 414, Internet traffic that was supposed to go to router 110 for netblock "24.158.32.0/22" may be again routed correctly toward router 110.

After the BGP hijack is withdrawn, in operation 415, the monitoring device 130 may generate and send BGP hijack all clear indication to the computing device 102. In operation 416, the computing device 102 may perform operations to withdraw the more-specific routing prefixes. For example, the computing device 102 may perform operations of methods 300 and/or 350 described above with reference to FIGS. 3A and 3B. The computing device may send a BGP update for its route to netblock "24.158.32.0/22" with the routing prefix "24.158.32.0/22" that is less-specific (i.e., has a shorter length of 22 bits) than the routing prefixes used to mitigate the BGP hijack of "24.158.32.0/24". The router 110 may update its routing table in operation 417 and update its neighbor router 112 as well. The router 112 may update its routing table in operation 418, and thereby the operations of the routers 110 and 112 may return to normal.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200, 300, and 350 may be substituted for or combined with one or more operations of the methods 200, 300, and 350, and vice versa.

Figure 5:
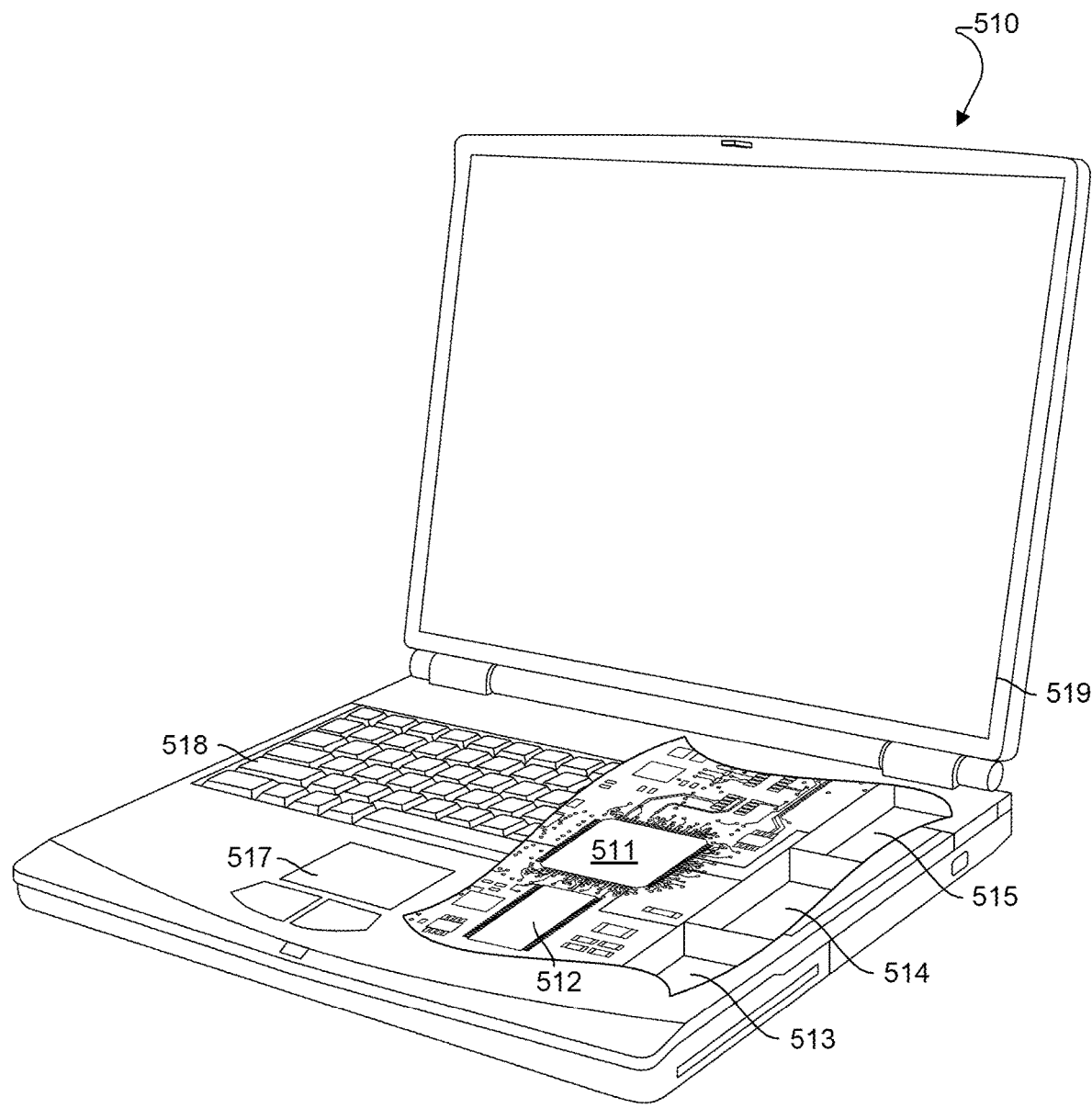
FIG. 5 is a component diagram of an example computing device suitable for use with various embodiments.

FIG. 5 is a component diagram of an example computing device suitable for use with various embodiments. The various embodiments (including, but not limited to, embodiments discussed above with reference to FIGS. 1-4) described above may also be implemented within a variety of computing devices, such as a laptop computer 510 as illustrated in FIG. 5. Many laptop computers include a touch pad touch surface 517 that serves as the computer's pointing device, and thus may receive drag, scroll, and flick gestures similar to those implemented on mobile computing devices equipped with a touch screen display and described above. A laptop computer 510 will typically include a processor 511 coupled to volatile memory 512 and a large capacity nonvolatile memory, such as a disk drive 513 of Flash memory. The laptop computer 510 may also include a floppy disc drive 514 and a compact disc (CD) drive 515 coupled to the processor 511. The laptop computer 510 may also include a number of connector ports coupled to the processor 511 for establishing data connections or receiving external memory devices, such as a USB or FireWire® connector sockets, or other network connection circuits (e.g., interfaces) for coupling the processor 511 to a network. In a notebook configuration, the computer housing may include the touchpad 517, the keyboard 518, and the display 519 all coupled to the processor 511. Other configurations of the computing device may include a computer mouse or trackball coupled to the processor (e.g., via a USB input) as are well known, which may also be used in conjunction with the various embodiments.

Figure 6:
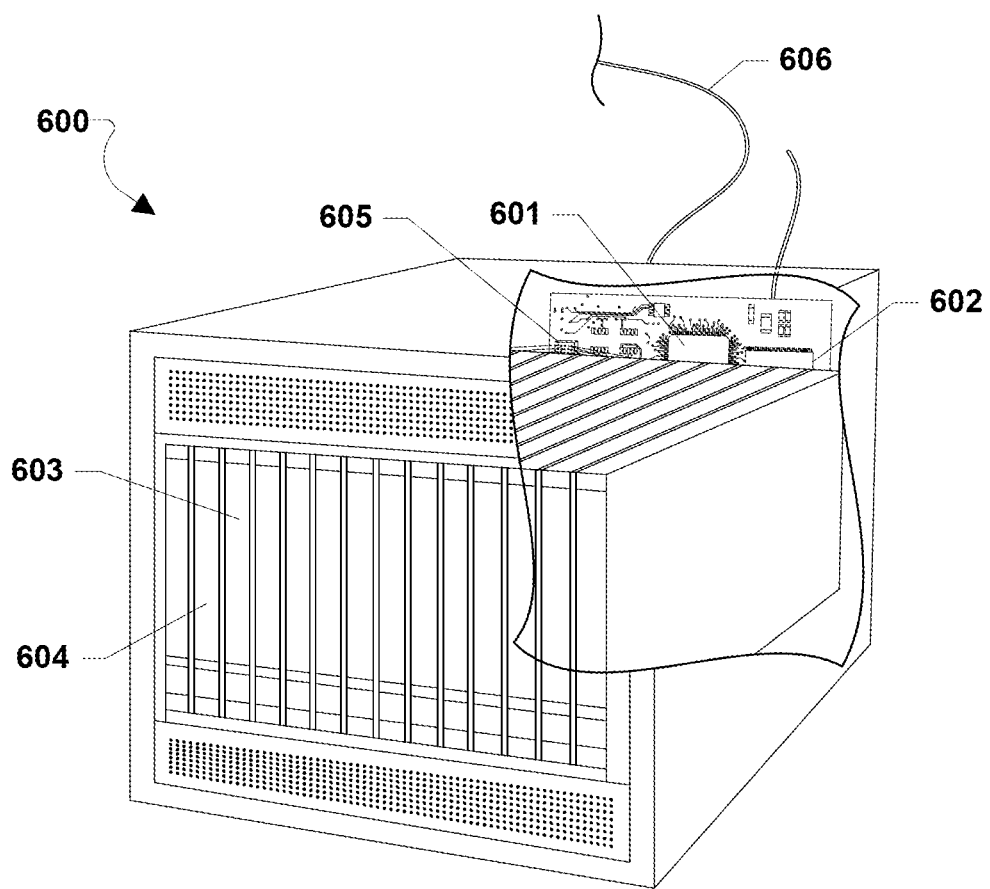
FIG. 6 is a component diagram of an example server suitable for use with the various embodiments.

Various embodiments (including, but not limited to, embodiments discussed above with reference to FIGS. 1-4) may be implemented on any of a variety of commercially available server devices, such as the server device 600 illustrated in FIG. 6. Such a server device 600 may include a processor 601 coupled to volatile memory 602 and a large capacity nonvolatile memory, such as a disk drive 603. The server device 600 may also include a floppy disc drive, compact disc (CD) or DVD disc drive 604 coupled to the processor 601. The server device 600 may also include network access ports 606 coupled to the processor 601 for establishing data connections with a network connection circuit 605 and a communication network (e.g., IP network) coupled to other communication system network elements.

The processors 511, 601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 511, 601. The processors 511, 601 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 511, 601 including internal memory or removable memory plugged into the device and memory within the processors 511, 601 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of mitigating a Border Gateway Protocol (BGP) hijack, comprising:
   determining, by a computing device, whether more-specific routing prefixes are available for a hijacked netblock based at least in part on a determined attribute of the hijacked netblock;
   generating, by the computing device, more-specific replacement routing prefixes for the hijacked netblock in response to determining that more-specific routing prefixes are available for the hijacked netblock; and
   sending, from the computing device, a BGP update including the more-specific replacement routing prefixes for the hijacked netblock to a router.

2. The method of claim 1, wherein the more-specific replacement routing prefixes for the hijacked netblock have a prefix length of 24 bits.

3. The method of claim 1, wherein the more-specific replacement routing prefixes for the hijacked netblock have a prefix length of 48 bits.

4. The method of claim 1, further comprising receiving, at the computing device, a BGP netblock hijack indication.

5. The method of claim 1, further comprising
   sending, from the computing device, a BGP withdraw removing the more-specific replacement routing prefixes for the hijacked netblock to the router to return the hijacked netblock to a routing prefix setting at a time a BGP hijack occurred in response to determining the BGP hijack is complete.

6. The method of claim 1, further comprising:
   generating, by the computing device, a less-specific routing prefix for the hijacked netblock in response to determining a BGP hijack is complete; and
   sending, from the computing device, the BGP update including the less-specific routing prefix for the hijacked netblock to the router.

7. The method of claim 6, wherein determining the BGP hijack is complete is based at least in part on a BGP netblock reclamation time period expiring or receiving a BGP netblock hijack all clear indication.

8. The method of claim 6, wherein the less-specific routing prefix for the hijacked netblock has a prefix length of 47 bits or lower.

9. A device, comprising:
   a memory; and
   a processor, coupled to the memory, wherein the processor is configured with processor-executable instructions to perform operations comprising:
      determining whether more-specific routing prefixes are available for a hijacked netblock based at least in part on a determined attribute of the hijacked netblock;
      generating more-specific replacement routing prefixes for the hijacked netblock in response to determining that more-specific routing prefixes are available for the hijacked netblock; and
      sending a Border Gateway Protocol (BGP) update including the more-specific replacement routing prefixes for the hijacked netblock to a router.

10. The device of claim 9, wherein the processor is configured with processor-executable instructions to perform operations such that the more-specific replacement routing prefixes for the hijacked netblock have a prefix length of 24 bits.

11. The device of claim 9, wherein the processor is configured with processor-executable instructions to perform operations such that the more-specific replacement routing prefixes for the hijacked netblock have a prefix length of 48 bits.

12. The device of claim 9, wherein the processor is configured with processor-executable instructions to perform operations further comprising receiving a BGP netblock hijack indication.

13. The device of claim 9, wherein the processor is configured with processor-executable instructions to perform operations further comprising:
   sending a BGP withdraw removing the more-specific replacement routing prefixes for the hijacked netblock to the router to return the hijacked netblock to a routing prefix setting at a time a BGP hijack occurred in response to determining the BGP hijack is complete.

14. The device of claim 9, wherein the processor is configured with processor-executable instructions to perform operations further comprising:
generating a less-specific routing prefix for the hijacked netblock in response to determining a BGP hijack is complete; and
sending a BGP update including the less-specific routing prefix for the hijacked netblock to the router.

15. The device of claim 14, wherein the processor is configured with processor-executable instructions to perform operations such that determining the BGP hijack is complete is based at least in part on a BGP netblock reclamation time period expiring or receiving a BGP netblock hijack all clear indication.

16. The device of claim 14, wherein the processor is configured with processor-executable instructions to perform operations such that the less-specific routing prefix for the hijacked netblock has a prefix length of 47 bits or lower.

17. A non-transitory processor-readable storage medium having stored thereon processor-executable instructions configured to cause a processor to perform operations, comprising:
determining whether more-specific routing prefixes are available for a hijacked netblock based at least in part on a determined attribute of the hijacked netblock;
generating more-specific replacement routing prefixes for the hijacked netblock in response to determining that more-specific routing prefixes are available for the hijacked netblock; and
sending a Border Gateway Protocol (BGP) update including the more-specific replacement routing prefixes for the hijacked netblock to a router.

18. The non-transitory processor-readable storage medium of claim 17, wherein the stored processor-executable instructions are configured to cause a processor to perform operations such that the more-specific replacement routing prefixes for the hijacked netblock have a prefix length of 24 bits.

19. The non-transitory processor-readable storage medium of claim 17, wherein the stored processor-executable instructions are configured to cause a processor to perform operations such that the more-specific replacement routing prefixes for the hijacked netblock have a prefix length of 48 bits.

20. The non-transitory processor-readable storage medium of claim 17, wherein the stored processor-executable instructions are configured to cause a processor to perform operations further comprising receiving a BGP netblock hijack indication.

21. The non-transitory processor-readable storage medium of claim 17, wherein the stored processor-executable instructions are configured to cause a processor to perform operations further comprising:
sending a BGP withdraw removing the more-specific replacement routing prefixes for the hijacked netblock to the router to return the hijacked netblock to a routing prefix setting at a time a BGP hijack occurred in response to determining the BGP hijack is complete.

22. The non-transitory processor-readable storage medium of claim 17, wherein the stored processor-executable instructions are configured to cause a processor to perform operations further comprising:
generating a less-specific routing prefix for the hijacked netblock in response to determining a BGP hijack is complete; and
sending a BGP update including the less-specific routing prefix for the hijacked netblock to the router.

23. The non-transitory processor-readable storage medium of claim 22, wherein the stored processor-executable instructions are configured to cause a processor to perform operations such that determining the BGP hijack is complete is based at least in part on a BGP netblock reclamation time period expiring or receiving a BGP netblock hijack all clear indication.

24. The non-transitory processor-readable storage medium of claim 22, wherein the stored processor-executable instructions are configured to cause a processor to perform operations such that the less-specific routing prefix for the hijacked netblock has a prefix length of 47 bits or lower.

* * * * *